(12) United States Patent
Hutcheson

(10) Patent No.: US 8,038,195 B1
(45) Date of Patent: Oct. 18, 2011

(54) STORAGE CONTAINER FOR A PICKUP TRUCK BED

(76) Inventor: Richard Hutcheson, El Dorado Hills, CA (US)

( * ) Notice: Subject to any disclaimer, the term of this patent is extended or adjusted under 35 U.S.C. 154(b) by 142 days.

(21) Appl. No.: 12/128,113

(22) Filed: May 28, 2008

Related U.S. Application Data

(60) Provisional application No. 60/943,390, filed on Jun. 12, 2007.

(51) Int. Cl.
*B60R 9/00* (2006.01)
(52) U.S. Cl. .................................. 296/37.6; 296/136.04
(58) Field of Classification Search .................. 296/37.6, 296/37.1, 100.01, 136.04, 136.06, 136.01, 296/10, 13, 180.1, 182.1
See application file for complete search history.

(56) References Cited

U.S. PATENT DOCUMENTS

| | | | |
|---|---|---|---|
| 4,288,011 A * | 9/1981 | Grossman | 224/404 |
| D294,816 S | 3/1988 | Hoyt | |
| 4,892,346 A | 1/1990 | Berlin | |
| 5,188,414 A * | 2/1993 | Burnham et al. | 296/37.6 |
| 5,316,358 A | 5/1994 | Payne et al. | |
| 5,464,264 A * | 11/1995 | Wilson | 296/37.6 |
| D366,448 S * | 1/1996 | Ney et al. | D12/414.1 |
| D414,302 S * | 9/1999 | Potestio | D30/108 |
| 6,030,018 A * | 2/2000 | Clare et al. | 296/37.6 |
| 6,244,651 B1 | 6/2001 | Hecock, Jr. | |
| 7,070,227 B2 * | 7/2006 | Hunt | 296/183.1 |
| 7,219,941 B1 * | 5/2007 | San Paolo et al. | 296/37.6 |

* cited by examiner

*Primary Examiner* — Glenn Dayoan
*Assistant Examiner* — Melissa A Black
(74) *Attorney, Agent, or Firm* — John P. Costello; Costello Law Corp.

(57) ABSTRACT

The invention is a storage container for mounting on the bed of a pickup truck. The invention requires that the pickup truck be modified by imparting equally placed left and right cutouts in the sidewalls of the bed of a pickup truck, the cutouts extending from the bed rails to about midway down the sidewalls of the bed. The inventive storage container is mounted in the cutouts and is of a width wherein the sides of the container coexist in approximate flush planar relation with the bed sidewalls and cab of the pickup truck to which the invention is attached. The mounting position of the container is such that it remains suspended in the bed cutouts a substantial distance above the deck of the pickup bed, thereby allowing elongate items such as 4×8 sheets of plywood to be accommodated beneath the container.

6 Claims, 7 Drawing Sheets

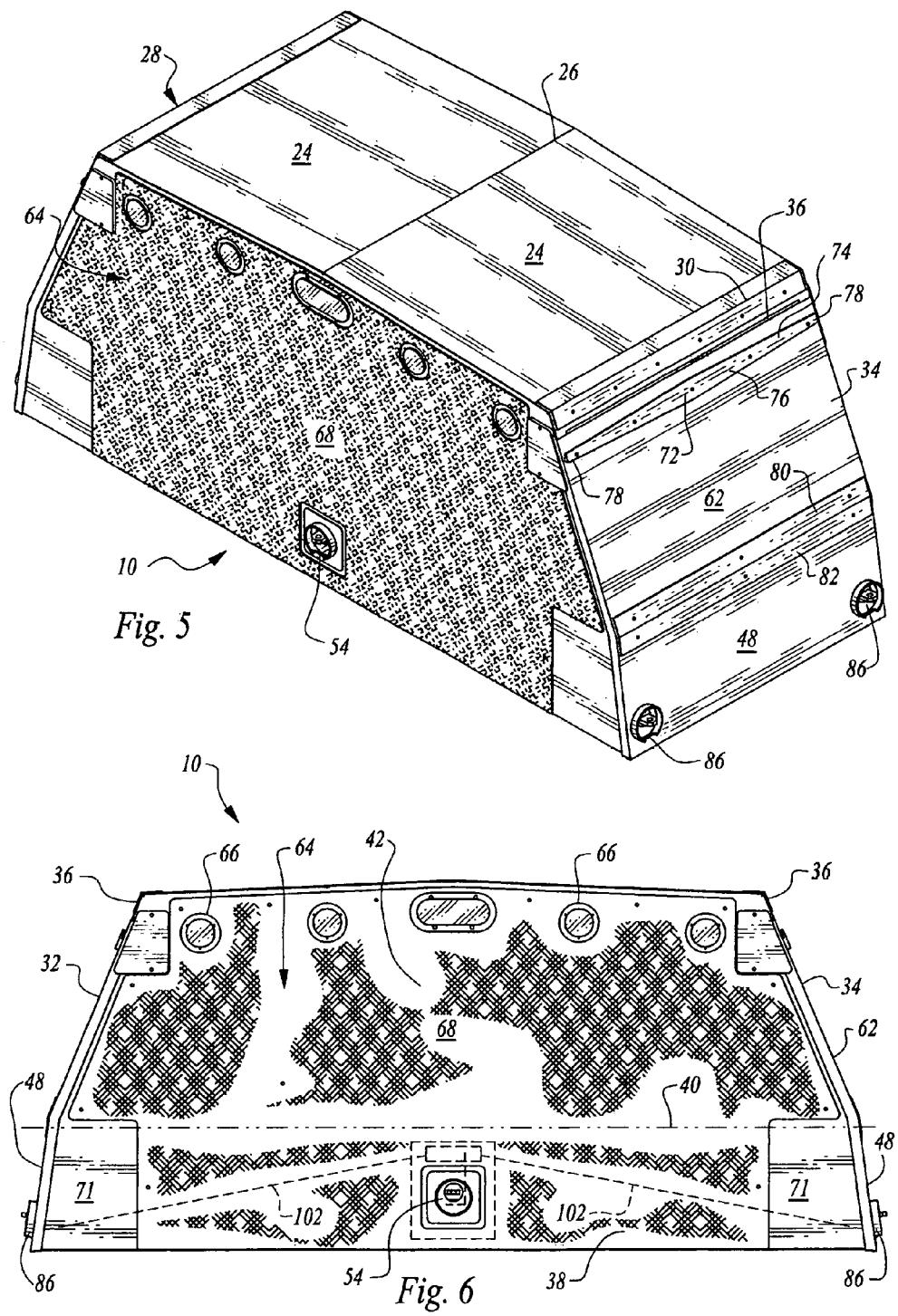

STORAGE CONTAINER FOR A PICKUP TRUCK BED

CROSS-REFERENCE TO RELATED APPLICATIONS

This application claims the benefit of U.S. Provisional Ser. No. 60/943,390, filed on Jun. 12, 2007.

TECHNICAL FIELD

This invention relates to vehicle mounted storage containers, and more particularly, to storage containers mountable on the bed of a pickup truck.

BACKGROUND

Storage containers for mounting in the bed of a pickup truck have been in existence for many years. These containers are most popular with workmen who desire ready and secure access to tools and materials. These containers are varied in design but are almost always mounted in the front of a pickup truck bed directly behind the cab. One typical version of these containers has dual access doors, which comprise the top surface of the container. The doors are left-right opposed and rotate from a level position, when closed, to an acute angled orientation relative to the top of the container, when open. U.S. Design No. 294,816, issued to Hoyt, is illustrative of this type of pickup bed mounted storage container. While utilitarian in many ways, this type of storage container forces the to extend his arm and shoulder considerably in order to reach over the pickup bed rails and access the storage container contents. This over-reaching motion can cause injury to the arm and shoulder joints as well as the lower back of the user. Additionally, the user cannot easily see into the depths of this type of container in order to access a desired tool or other object. In many cases the user jumps into and out of the pick-up bed to access tools located in the toolbox, which can lead to worker injuries, such as twisted ankles or even broken legs.

Another option has been to employ a pickup truck bed cap which is essentially a large container situated between the bed rails and fastened to the bed deck or even to the truck frame. Exemplary bed cap containers can be found in U.S. Pat. No. 4,892,346 issued to Berlin and U.S. Pat. No. 6,244,651 issued to Hecock, Jr. These containers suffer from the drawback that their access doors, being positioned in the rear of the container, can only be reached by the user first climbing into the pickup bed, which, as noted above, is a wholly impractical and potentially injurious method of access for the average workman.

The storage containers cited thus far also suffer from the drawback that their placement in the bed significantly reduces the amount of bed length and volume which can be used to transport lengthy materials such as 4×8 plywood sheets and 8-foot 2×4's. The only options available with these prior art containers is to transport lengthy materials with the tailgate down, or else position the materials at downward angle in the bed with the protruding ends of these materials located upon the top of the closed tailgate. The tailgate "down" option presents the possibility of the materials being ejected during acceleration, which can present road safety issues as well as the loss of expensive materials. The tailgate "up" option makes it difficult to unload heavy materials positioned at an angle in the bed, and also makes it difficult to transport other tools or objects, which invariably will roll forward upon the angled surface.

The storage container disclosed in U.S. Utility Pat. No. 5,316,358 issued to Payne, et al., offers a better solution, in that it presents a storage container mounted between the bed and cab and having gull wing access doors. The lower part of the access doors present a surface that orients flush with the pickup bed and cab sides, when the door is in its closed position. This gull wing design allows considerable ergonomic access and an easy view into the contents of the container by the user. However this container requires that the pickup bed be mounted behind it, which to maintain a standard pickup length would mean that the bed would have to be made considerably shorter than standard beds, thus again limiting the size of cargo that could be carried on the deck of the pickup bed.

Therefore a need exists for a pickup mounted storage container which has a large storage capacity and which can be ergonomically accessed by the user. Also, a need exists for a pickup bed mounted storage container which is arranged to allow for the entire length of a pickup bed to remain available for transporting large materials, such as plywood sheets and long 2×4 planks.

The foregoing reflects the state of the art of which the inventor is aware, and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

The invention is a large-volume storage container for mounting to a pickup truck bed of the type with longitudinally disposed vertical sidewalls and having a load deck disposed between the sidewalls, wherein the bed is further longitudinally spaced from the pickup cab. The inventive container possesses the advantages of ergonomic accessibility and further allows the entire length of a pickup truck bed to remain accessible for transporting lengthy materials such as 4×8 sheets of plywood. The inventive storage container is comprised of a lower section having left and right sides that are in a substantially flush planar relation to the sidewalls of a pickup bed to which the container is mounted. An upper section of the container extends upward from the lower section wherein the roof of the container is preferably substantially flush with the roof of the pickup cab and the sides of the upper section are substantially flush with the sides of the upper portion of the cab. To accommodate the container, a cutout is made through the sidewalls of the pickup bed, the cutout having a longitudinal width wide enough to accommodate the width of the lower section of the container. The cutout is capped with a ten-gage flat stock steel closure that is shaped and welded to conform to the shape of each pick-up bed model. The cutout can also be covered up with an insert in a preferred embodiment, wherein the insert is designed to provide anchoring for the inventive container and both strengthening and cosmetic characteristics to the cutout.

The inventive container has at least one access door, which comprises the side of the container, the door being arranged in flush planar relation to both the bed sidewalls and the cab of the pickup to which the container is attached. The door is hingedly secured near the top of the container so that it opens in a gull-wing orientation, lifting up and resting in an open position above the height of a medium to tall user. A pair of gas shocks insures that the door remains stationary in its open position. The gull-wing orientation keeps the door above the user, thereby allowing him to ergonomically access the container without having to over reach or contort into unnatural positions to access an item within the container. The access door is preferably opened through a remote entry electronic latch. The user would carry a coded electronic entry fob, which would provide secure access by allowing only the user to enter his container. Further, when the access doors are in their closed position, they can be locked with high security manual key locks for added security and safety.

A transversely movable utility tray can be fitted within the interior of the inventive storage container for holding many objects. The tray is transversely movable, left or right, and can be locked in three separate transverse positions, and can further be articulated from either side of the container. If the tray is moved to its side-most position, the full height of the container becomes available to place elongate tools, objects or building materials.

The inventive container is supported in the reinforced cutouts of the pickup bed sidewalls. The cutouts extend only partially down the sidewalls so that a substantial portion of the sidewalls remains above the deck of the pickup bed. When the inventive container is supported in the left and right cutouts, the bottom surface of the container is elevated a distance above the deck of the pickup bed, thus allowing for sufficient volume beneath the container to remain for placing materials and other objects. This feature is especially important when placing elongate objects such as 4×8 plywood sheets into a pickup bed having the inventive container mounted thereon. The lengthwise dimension of a typical long bed pickup is eight (8) feet which means that an entire sheet of plywood could still lay flat on the deck of the bed with the tailgate closed when the inventive container is mounted on the same bed.

Accordingly, the following objects and advantages of the invention apply:

It is an object of this invention to provide an inventive storage container for a pickup truck that allows the interior to be ergonomically accessible by a user.

It is another object of this invention to provide an inventive storage container that is aerodynamic in design.

It is still another object of this invention to provide an inventive storage container, which provides a high level of security to contents stored in the inventive container.

It is still another object of this invention to provide an inventive storage container, which allows the full length of a pickup bed to remain available for the transport of elongate objects within the bed.

Another object of the invention is to provide a pickup truck which incorporates the inventive storage container.

It is another objective of this invention to incorporate vehicle safety lights in the design of the inventive container.

Further objects and advantages of the invention will be brought out in the following portions of the specification, wherein the detailed description is for the purpose of fully disclosing the preferred embodiments of the invention, without placing limitations thereon.

BRIEF DESCRIPTION OF THE DRAWINGS

The invention will be more fully understood by reference to the following drawings which are for illustrative purposes only:

FIG. 5 is an elevated perspective view of the inventive storage container.

FIG. 6 is a rear view of the inventive storage container.

DETAILED DESCRIPTION OF THE PREFERRED EMBODIMENTS

Figure 1:
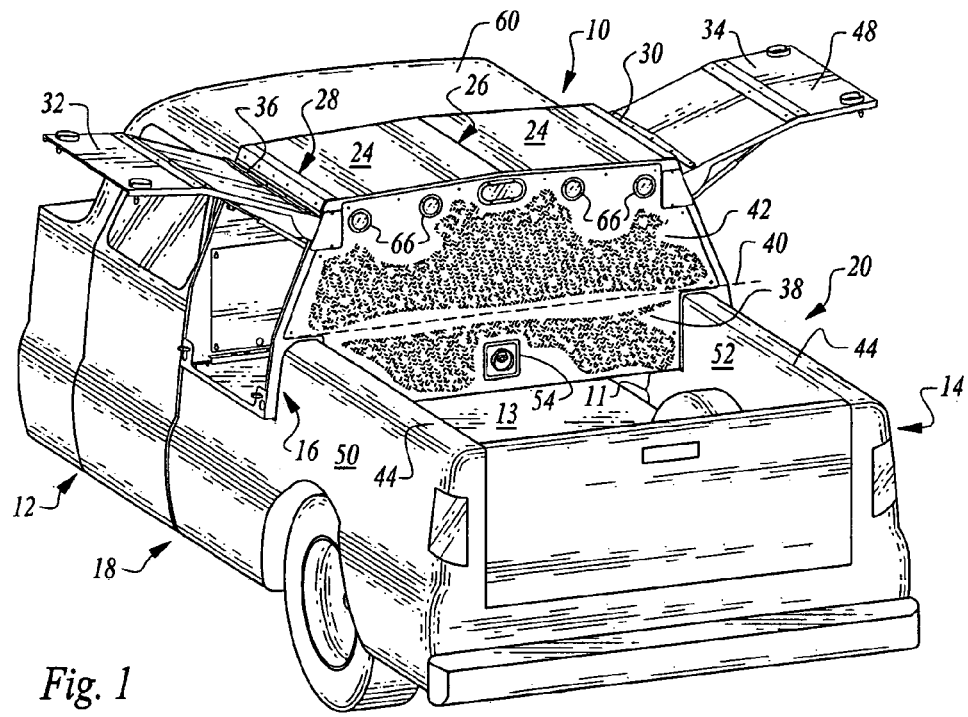
FIG. 1 is a perspective view of the inventive storage container shown mounted upon a pickup truck, with the left and right access doors of the container shown in an open position.
Figure 2:
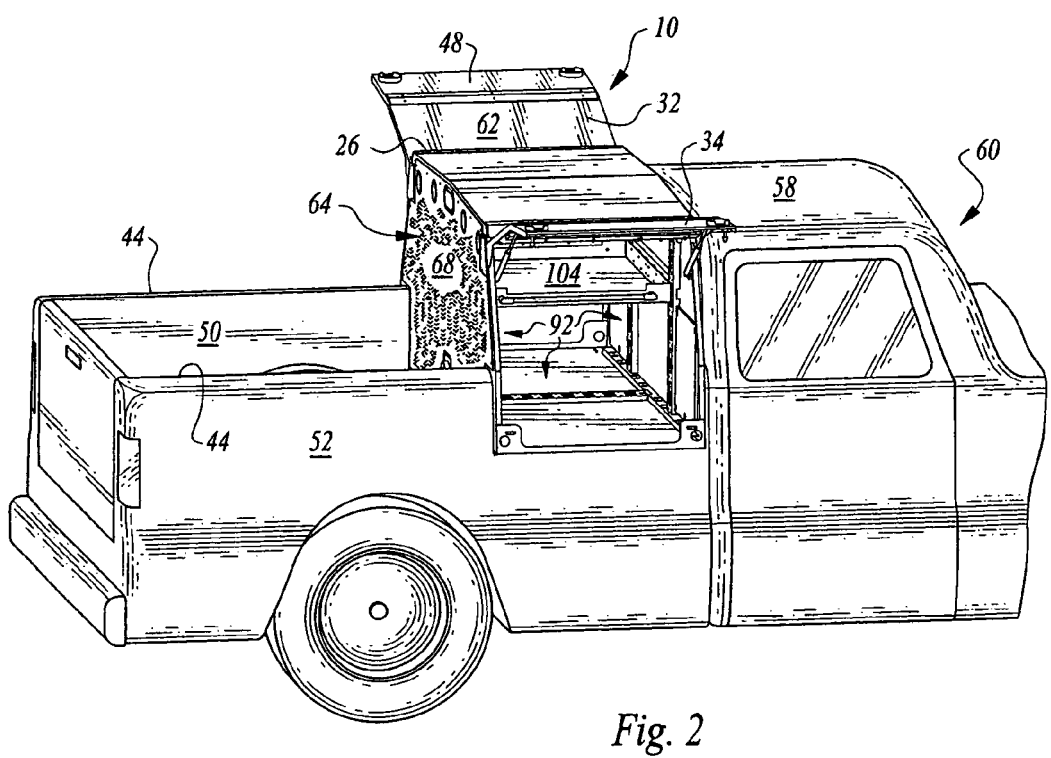
FIG. 2 is a side view of the inventive storage container shown mounted upon a pickup truck.
Figure 3:
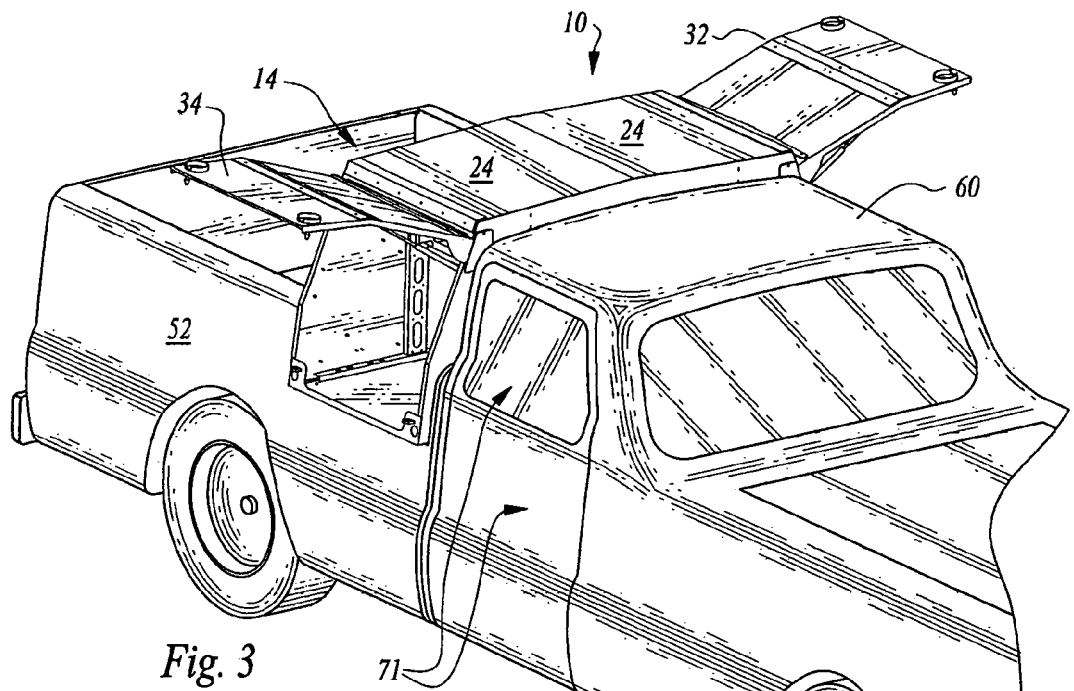
FIG. 3 is a front view of a pickup truck having the inventive storage container mounted thereon.
Figure 4:
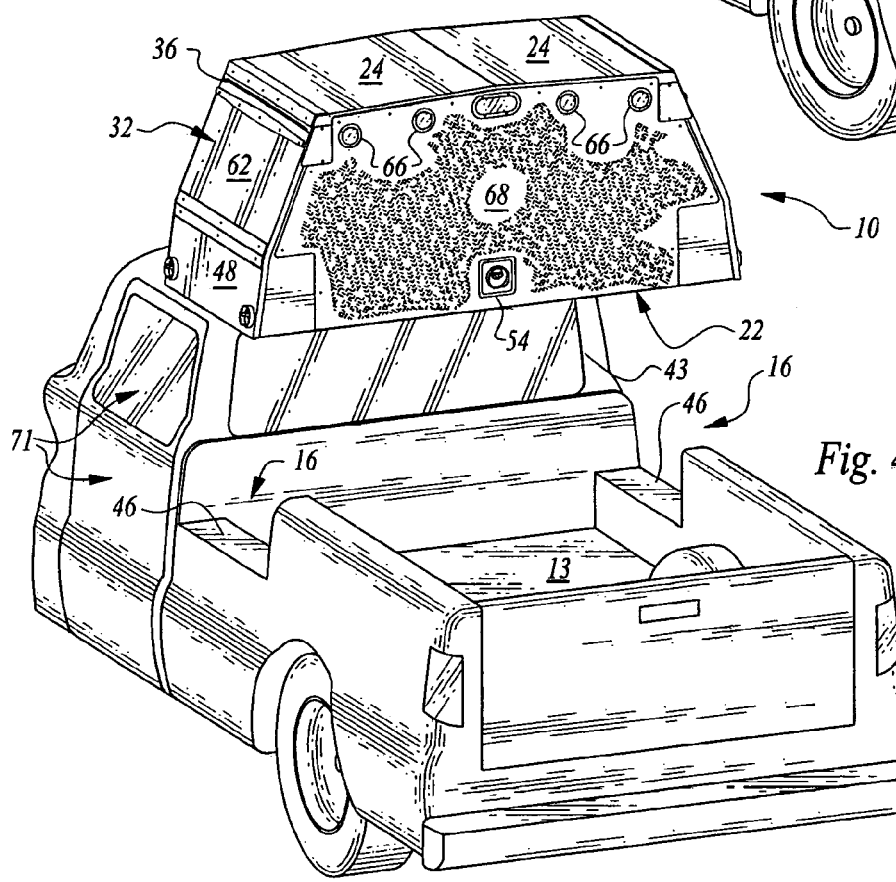
FIG. 4 is a perspective view of the pickup and container, showing the inventive container separated from the bed of a pickup truck that is modified with bed cutouts fashioned to receive the container.

Referring to FIGS. 1-3, the inventive storage container 10 is shown mounted upon a pickup truck 12 positioned at various angles to give the reader perspective as to how the container 10 would appear and function when it is mounted to a pickup truck 12. In FIG. 4, the inventive container 10 and pickup 12 are shown separated from each other so that the viewer can understand that to accommodate the inventive container 10, the bed 14 of a pickup 12 must be modified by placing a cutout 16 in the left 18 and right 20 sides of the bed 14, the cutouts flushly approximating the shape of the container 10 so that the fit is tight and rattle-free.

Referring also to FIGS. 5-9 the inventive container 10 is shown by itself, so as to give the reader a clear view of its exterior features. The bottom surface 22 of the container 10 is planar, while the roof 24 of the container 10 is tapered. The tapered roof 24 progresses from a highpoint at the roof midline 26, downward, toward the left 28 and right 30 terminal points. The preferred angle of roof taper is 2° (two degrees) which provides sufficient angle for rain water runoff. Left 32 and right 34 access doors comprise the sides of the container 10 in its preferred form. The access doors 32, 34 are opened by a remote electronic latching device, which provides a higher level of security for the inventive container 10. Once unlocked, the doors 32, 34 are hingedly secured 36 near the roof 24 of the container 10 and open outward in a gull-wing manner as will be further described herein.

As best illustrated in FIG. 6, the container 10 can be divided into a lower section 38 as defined by the portion of the container located below dotted line 40 and an upper section 42 as defined by the portion of the container located above dotted line 40. When the container 10 is mounted on a pickup truck 12, the lower section 38 extends approximately from the longitudinally disposed bed rails 44 to the bottom surface 22 of the container 10, which rests on the bottom surface 46 of the cutout 16. The lower section 48 of side access doors 32, 34 comprises the exterior sides of lower section 38, and they are arranged in approximate flush planar relation to the exterior sidewalls 50, 52 of pickup bed 12 to which the container 10 is attached. Lower section 38 also comprises an access point 54 for an emergency manual cable release 102 for the access door latches, should the remote electronic latching device fail. When it is not being used, the manual cable release 102 is covered by a locking top cover (not shown). The inventor has found the American Lock Company model Series 2000 lock to be preferred to secure the top cover (not shown) as well as the access doors 32, 34 of the container. The Series 2000 lock is a high security lock that features an interior-activated locking mechanism that makes it very difficult to be cut off, shot off, or bruised with a hammer device.

Still referring to FIG. 6, the upper section 42 of the inventive container 10 extends from approximately the top of the pickup bed rails 44 to the top 58 of the pickup bed cab 60. The upper section 62 of side access doors 32, 34 comprises the exterior sides of upper section 42, and they are arranged in approximate flush planar relation to the exterior sides of a pickup bed cab 60. As a safety feature, the back surface 64 of the upper section 42 can be adorned with a plurality of vehicle safety lights 66, such as brake lights, turn signal lights or flood lighting. Also, to provide a level of protection to the back surface 64 of the container 10, a protective steel diamond plate 68 can be added to the back surface 64. The diamond plate 68 covers the areas of the back surface that would be exposed to scuffs and denting caused from the impact of various pickup bed contents. By being removable, the diamond plate 68 could be replaced to maintain a quality appearance. Exposed areas 71 of the back surface 64 would be covered by the pickup bed side walls 50, 52, so it is not necessary to expand the coverage of the diamond plate 68 into these areas.

Figure 7:
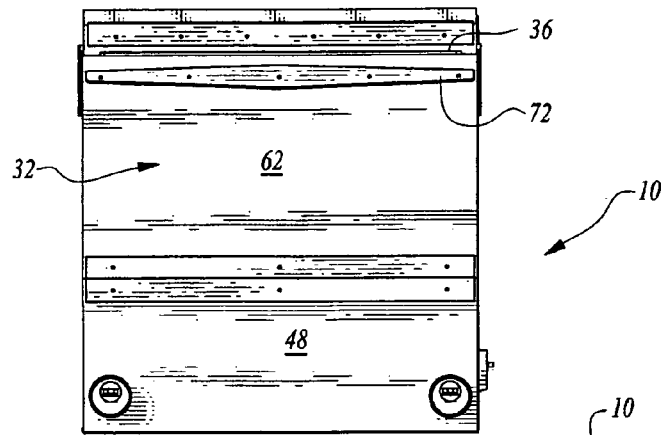
FIG. 7 is a close up side view of the inventive storage container.
Figure 8:
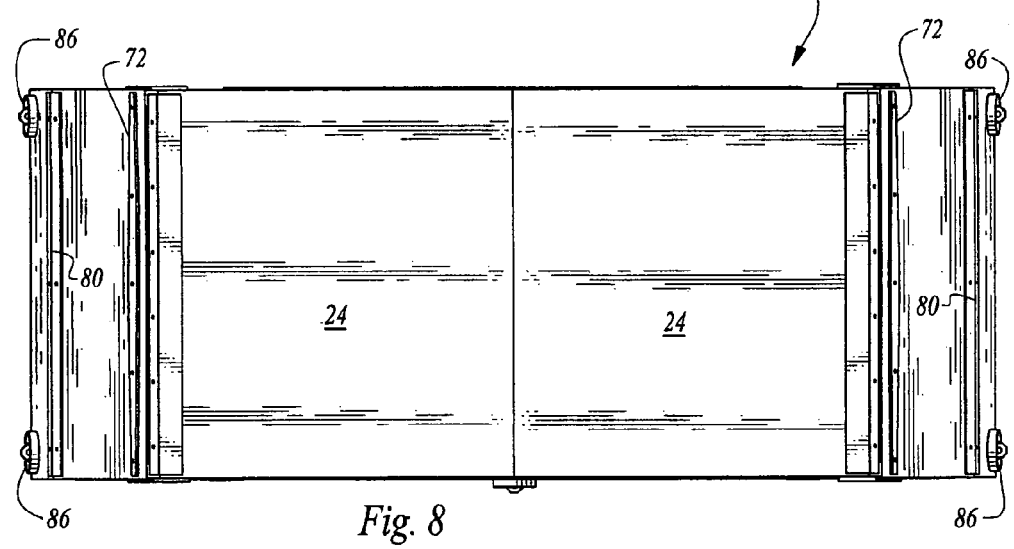
FIG. 8 is a plan view of the inventive storage container.

Referring now to FIG. 7, the side of the container 10 is shown. The great majority of the sides of container 10 are comprised of the access doors 32, 34. The access door 32 is secured by hinge 36. A bilateral tapered member 72 is located transversely across the door 32 and below the hinge 36. The tapered member 72 is tapered on both its top 74 and bottom 76 edges to insure that water contacting the tapered member 72 will be directed down the member and off the ends 78 of tapered member 72, whether the door 32 is in an open or a closed position. The leading edge 80, which serves as the transition point between the upper 42 and lower 38 sections, is adorned with a steel diamond kick plate 82 to protect against damage. At the bottom of the door 32 are a pair of American Lock Series 2000 locks (not shown), which can optionally be locked in receivers 86 located over the striker plate component of each corresponding latch so that the striker cannot be drilled or manually pried from the striker plate and the door opened. When a workman is through using the storage container for the day the manual locks 84 would be placed in the receivers to further secure the container.

Figure 9:
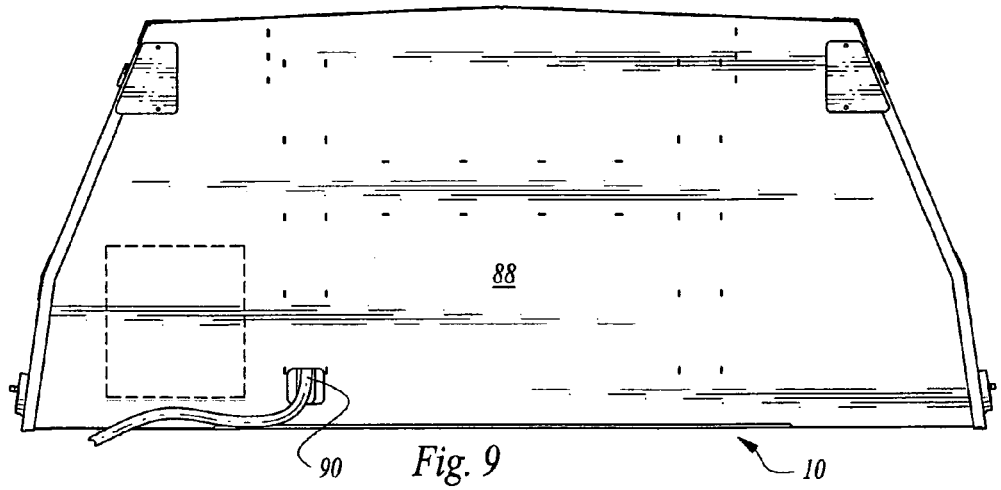
FIG. 9 is a front view of the inventive storage container.

FIG. 9 is a view of the front side 88 of the container 10 which is the side of the container facing the cab 60 when the container 10 is mounted on a pickup truck 12. Most notable about the front side 88 of the container is the power cord 90, which connects to the current flow generated by the pickup truck's engine. An inverter located inside of the container (not shown) transforms the DC current from the truck into usable AC current for the operation of lights and power tools. Plug outlets installed inside the container 10 are protected by a ground fault interrupter (GFI) circuit.

Figure 10:
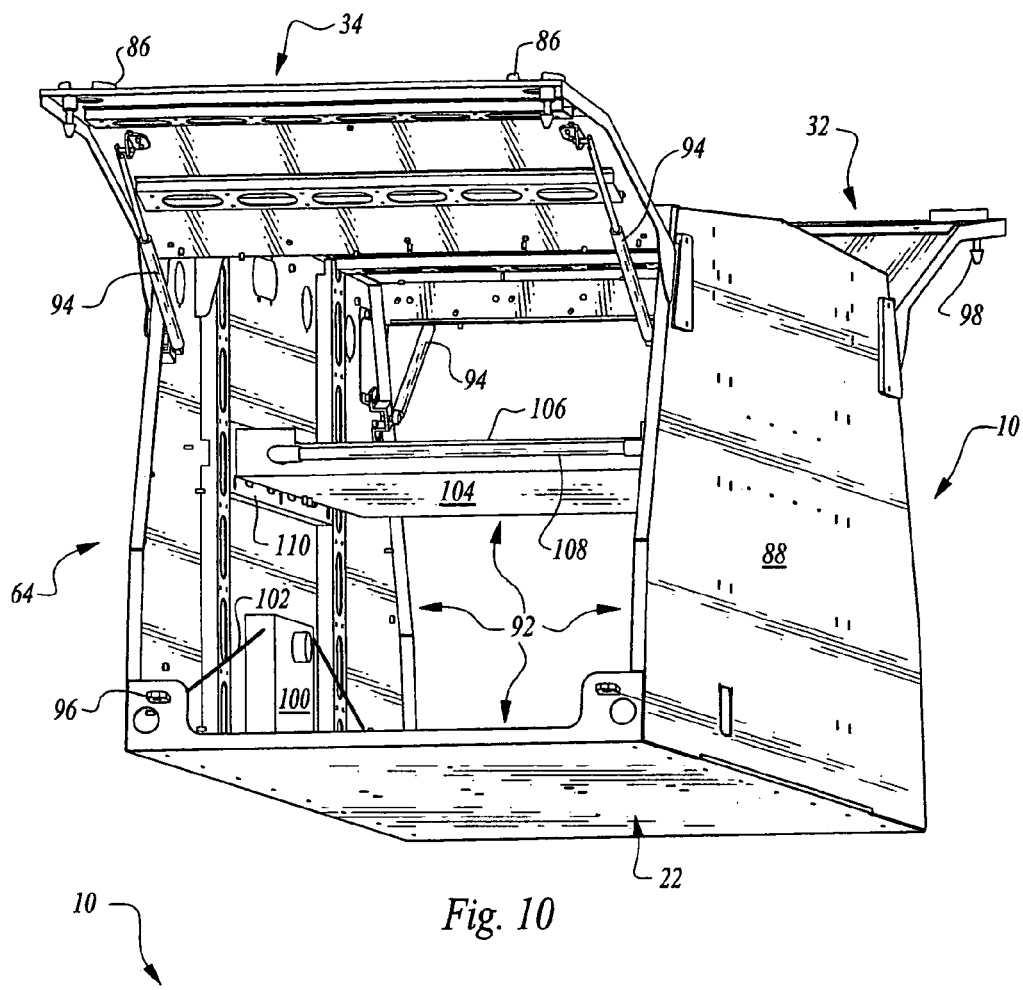
FIG. 10 is a side elevated perspective view showing the side doors of the inventive container opened and showing a full view of the interior lumen of the container.

FIG. 10 illustrates the features present in the interior lumen 92 of the inventive container 10. The side access doors 32, 34 open outward in gull-wing fashion and are supported in their open position by a pair of gas shocks 94. The door striker plates 96 are located in left-right orientation near the bottom of the container 10 and engage with the door strikers 98. The strikers 98 are electronically actuated when the user activates a remote key fob transmitter, which communicates with an electric motor 100 coupled to a door release cable 102, the motor 100 being in communication with a receiver (not shown). The door release cable 102 is preferably threaded from the motor 100 through the structural channel steel members, which support the container. When actuated, the strikers 98 release, and the door opens a small distance, that is wide enough to allow the user to place his fingers beneath the door and open it. Additionally, there is added security to the toolbox because there are no door handles to pry open or break. Upon opening the door, a pressure switch is engaged and an interior light is automatically switched on to illuminate the lumen 92 of the container 10. The light can be manually turned off with a switch once the door 34 is opened.

Figure 11A:
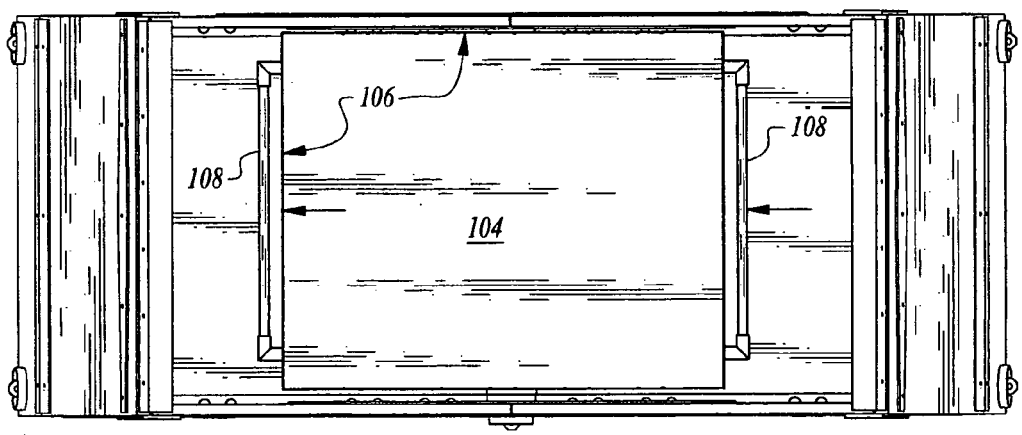
FIG. 11A is a plan cutaway view through the inventive container showing the utility tray located at a center position within the container.
Figure 11B:
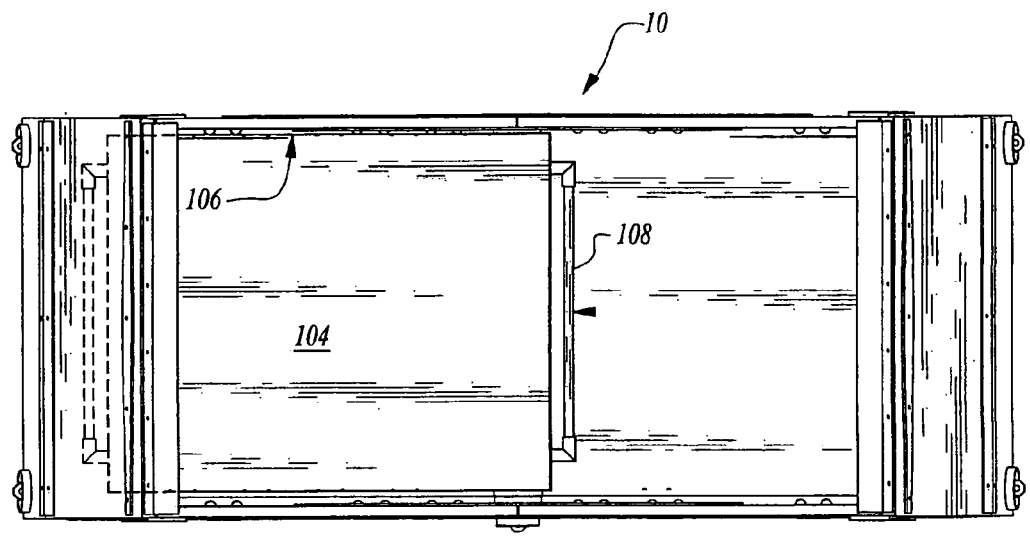
FIG. 11B is a plan cutaway view through the inventive container showing the utility tray located at its furthest left side positioning within the container for comparison with FIG. 11A.

The lumen 92 of the container 10 is occupied by a utility tray 104 that is transversely movable within the container 10. The utility tray 104 has deep sidewalls 106 for retaining objects thereon and a handle 108 on each opposite end of the tray 104 to allow it to move it between various transverse positions. The tray 104 moves on roller bearings which engage with rail brackets 110 attached to the interior front and rear sides of the container. FIGS. 11A and 11B illustrate the tray 104 moving transversely within the container 10. In FIG. 11A, the tray 104 is located at a midway position, while in FIG. 11B, the tray 104 is moved to its maximum travel point at the left side of the container 10. At each position, the tray 104 is locked in place by a pin (not shown) which engages with a hole located in bracket 110. The pin can be manually disengaged by the user and the tray 104 positioned to a new desired location.

Figure 12A:
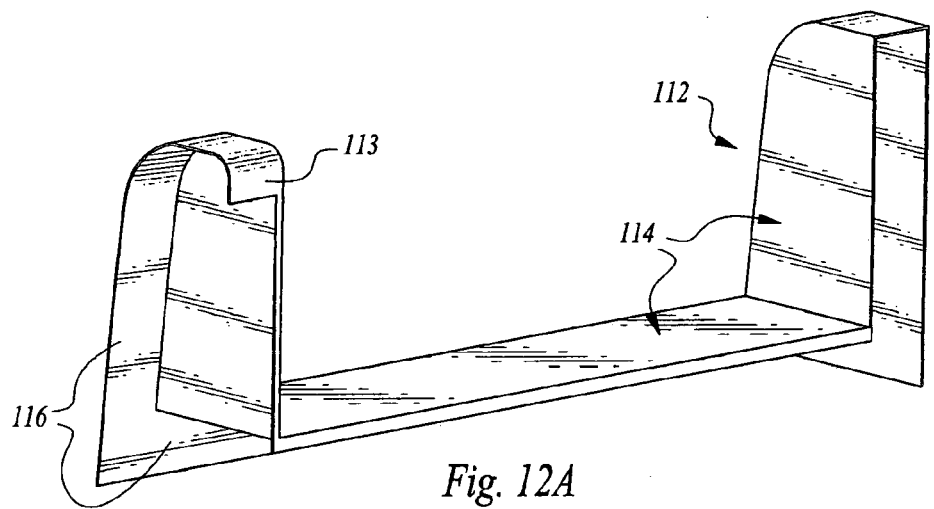
FIG. 12A is a perspective view of a pickup bed insert used to modify a pickup truck bed for accommodating the inventive storage container.
Figure 12B:
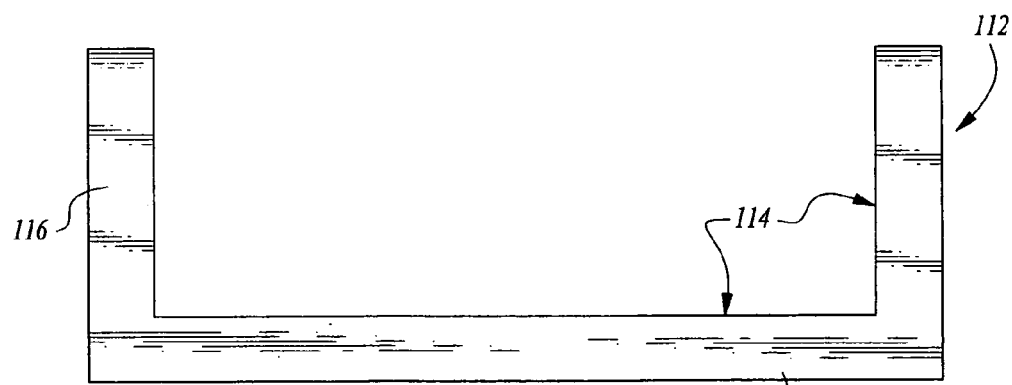
FIG. 12B is an exterior side view of the pickup bed insert of FIG. 12A.

FIGS. 12A and 12B show the pickup bed insert 112 within which the inventive container 10 is supported. The inserts 112 are preferably made of 10-guage steel that are shaped to each individual pick-up bed model to match the contours of the bed side walls 50, 52. The insert 112 provides cosmetic appeal and structural support to the modified pickup bed 14 to which it is attached. Attachment of the insert within the cutout can be done through welding or using fasteners, for example. The interior surface 114 of the insert 112 matches the shape of the container 10 that is mounted in the insert 112. The top 113 of the insert marks the start of an annular lip 116, which fits over the rails 44 of a pickup bed 14; the lip 116 migrates downward to eventually surround the interior surface 114 of the insert 112 and forming a border around the interior surface 114 of the insert. The annular lip serves to hold the insert on the bed rails 44 and also to cover up any imperfect lines or jagged edges of the cutout.

Figure 13A:
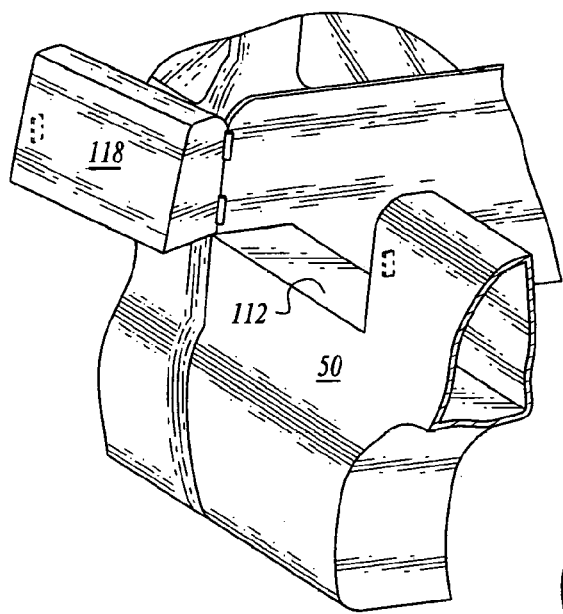
FIG. 13A is a perspective view of the pickup bed insert having an attached door, with the door shown in the opened position.
Figure 13B:
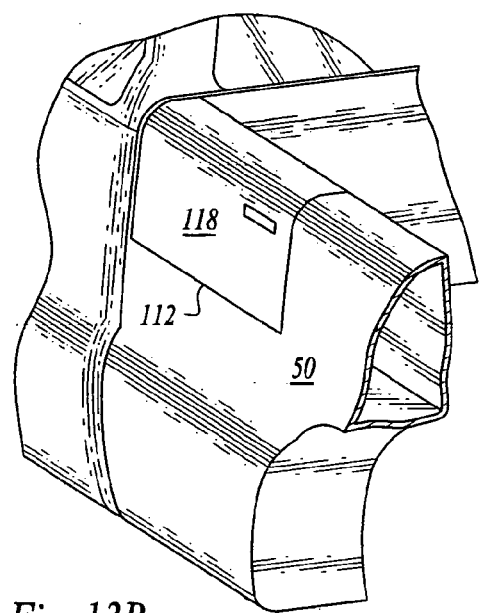
FIG. 13B is the pickup bed insert and door of FIG. 13A, with the door shown in the closed position.

FIG. 13A illustrates a swing-away insert door 118, which is positioned in insert 112 to close off the cutout 16 in the pickup bed side walls 50, 52 when the inventive container 10 is removed from the pickup bed 14. The door 118 serves to restore the integrity of the sidewalls so that the entire carrying capacity of the pickup bed can then be used. Without the restorative quality of the door in the insert, small items, such as pieces of firewood could roll through the inserts and onto a road surface, for example, thus creating a road hazard in addition to losing cargo. FIG. 13B shows the insert door in its fully latched position within the insert. The insert door is removable and the communication of the insert and door is such that the latching and hinge mechanisms do not create any obstruction to replacing the container when the door is removed.

Figure 14:
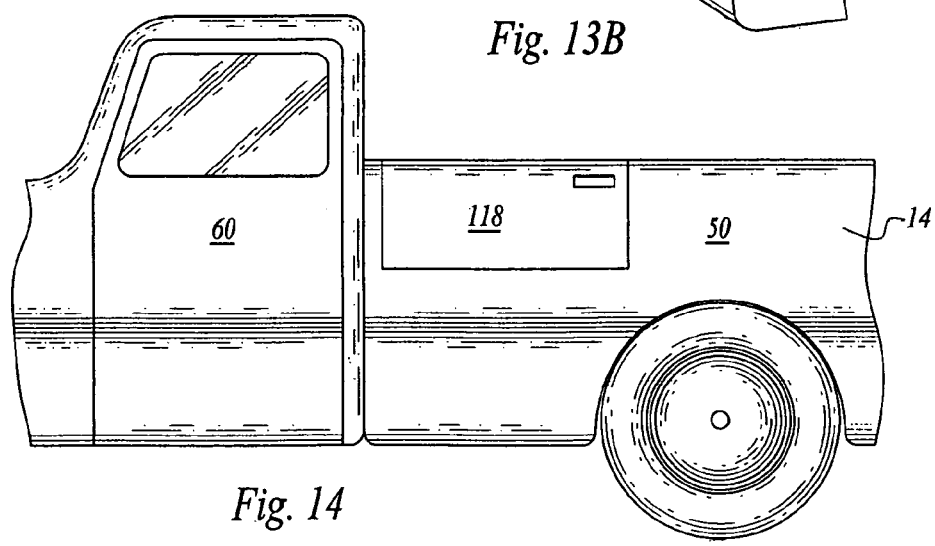
FIG. 14 shows a pickup truck having a bed cutout, the bed cutout being shown with an attached door.

FIG. 14 shows the insert door as it might appear installed on a pickup truck. The insert door can also serve independently of any association with the inventive container, in that it makes the front portion of a pickup bed fully accessible by obviating the need for a user to reach over the bed rails and strain to reach contents in the front of the pickup truck bed. Also, it is consistent with this invention that the door be used without an insert, as the insert is mainly used to convert existing pickup beds which have no cutout. It is within the scope of this invention that a pickup bed be initially designed and manufactured to have a cutout and a door occupying the cutout. By manufacturing pickups to have a cutout and door, the cited improvement to accessibility to the front of the bed could be incorporated into new models of pickups.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims, which are supported by this specification.

The invention claimed is:

1. A storage container for mounting upon a pickup truck having a cab and a bed, the bed having longitudinally disposed bed rails topping a pair of vertically arrayed, longitudinally extending left and right sidewalls, wherein each sidewall has a vertical cutout imparted therein near the front of the bed, the cutout extending through the bedrails and each cutout having a bottom, the bed further having an interior loading deck disposed between the side walls and wherein the storage container comprises:

a planar bottom surface, a front surface, a rear surface and a tapered roof;

a lower section having left and right sides made to be in substantially flush planar relation with the side walls of a pickup bed, said lower section made to extend downward below the bed rails of a pickup, said lower section terminating in said planar container bottom;

an upper section extending above said lower section, said upper section having left and right sides made to be in substantially flush planar relation with the sides of a pickup cab, said upper section made to extend upwardly above the bed rails of a pickup, said upper section terminating in said tapered roof, said tapered roof being of a height approximate to the roof of a pickup cab when said lower section is being supported within said vertical sidewall cutouts;

said container being of a width greater than the width of a pickup loading deck so as to break the vertical plane defined by a pickup's sidewalls;

at least one side opening accessible at a one side of said storage container, said side opening providing entry into an interior lumen of said container;

an access door hingedly secured to close over said side opening, said access door spanning over both said upper and lower sections of said container and defining said sides of both said upper and lower sections when said door is in a closed position;

said access door actuating a pressure switch to illuminate the interior lumen of said container;

a tapered member located transversely across said access door below said hinge attachment, said tapered member being tapered along both its top and bottom edges;

a plurality of vehicle safety lights adorning said rear surface of said container;

an inverter located inside of said container for transforming vehicle DC current into AC current; and a utility tray, said tray being transversely movable within said lumen between said left and right sides of said storage container, said tray being mounted on a sliding bracket assembly attached to said front and rear sides of said container, said bracket assembly providing a plurality of stop positions for locking said utility tray in place at a desired transverse position, said tray including elevated sides for retaining articles within said tray.

2. The storage container as recited in claim 1, further comprising both left and right side openings defining both said left and right sides, wherein each side comprises a one of said access doors.

3. The storage container as recited in claim 2, wherein said access doors are hingedly secured in gull wing fashion to said left and right sides.

4. The storage container as recited in claim 3, wherein each of said access doors is lockable.

5. The storage container as recited in claim 4, wherein said lockable doors have locks that are remotely electronically actuated.

6. The storage container as recited in claim 5, further comprising an access point having an emergency manual cable release for said access door locks, should said remote electronic locking device fail.

* * * * *